United States Patent [19]

Ono et al.

[11] Patent Number: 5,027,394
[45] Date of Patent: Jun. 25, 1991

[54] FOLDING TYPE TELEPHONE CONTAINING A WOUND ELECTRICAL CONNECTION

[75] Inventors: Kenji Ono; Hajime Iribe, both of Fukuoka, Japan

[73] Assignee: Matsushita Electric Industrial Co., Ltd., Kadoma, Japan

[21] Appl. No.: 251,399

[22] Filed: Sep. 30, 1988

[30] Foreign Application Priority Data

Sep. 30, 1987 [JP] Japan .................................. 62-246434

[51] Int. Cl.$^5$ ............................................. H04M 1/02
[52] U.S. Cl. .................................... 379/434; 379/433; 379/438
[58] Field of Search ............... 379/434, 413, 419, 428, 379/429, 433, 438, 440, 441, 442, 61; 439/31; 16/222, 386, 387

[56] References Cited

U.S. PATENT DOCUMENTS

| | | | |
|---|---|---|---|
| 3,551,607 | 12/1967 | Tommasi et al. | 379/433 |
| 4,018,998 | 4/1977 | Wegner | 379/433 |
| 4,450,495 | 5/1984 | Naruki | 439/31 |

FOREIGN PATENT DOCUMENTS

| | | | |
|---|---|---|---|
| 822251 | 11/1951 | Fed. Rep. of Germany . | |
| 3309832 | 9/1984 | Fed. Rep. of Germany | 379/61 |
| 3401518 | 7/1985 | Fed. Rep. of Germany | 379/428 |
| 590514 | 4/1925 | France . | |
| 1143203 | 9/1957 | France | 379/434 |
| 2601211 | 1/1988 | France | 379/429 |
| 59-135959 | 8/1984 | Japan | 379/433 |
| 59-135960 | 8/1984 | Japan | 379/428 |
| 423319 | 1/1935 | United Kingdom | 439/31 |
| 1212389 | 11/1970 | United Kingdom . | |
| 2158328 | 11/1985 | United Kingdom | 379/61 |

OTHER PUBLICATIONS

"GTE-Flip-Phone", *Telephony*, Jul. 16, 1979.
Tommasi et al, "Telephone Set", issued Aug. 13, 1968, #792,307, La Gazette Du Bureau Des Brerets (French).

*Primary Examiner*—Jin F. Ng
*Assistant Examiner*—M. Nelson McGeary, III
*Attorney, Agent, or Firm*—Cushman, Darby & Cushman

[57] ABSTRACT

In a folding type telephone apparatus of folding type comprising a first housing and a second housing rotatably connected by a hinge, electric components and printed circuit boards of respective housings are connected by an electrical connecting member of a tape shaped flexible printed circuit which is wound at least two times around a shaft of the hinge. Using the wound electrical connecting member maintains a reliable electrical connection between the housings even after the telephone apparatus has been used for a long time.

3 Claims, 5 Drawing Sheets

FOLDING TYPE TELEPHONE CONTAINING A WOUND ELECTRICAL CONNECTION

FIELD OF THE INVENTION AND RELATED ART STATEMENT

1. Field of the Invention

The present invention relates to a telephone, particularly a folding type wireless telephone.

2. Description of the Related Art

Recently, various types of folding telephones have been provided in order to provide a small-sized or portable telephone. Prior art folding type telephones are described in wireless telephone application as one example. A wireless telephone has many push buttoms such as dial push buttons and other electrical components such as lamps as indicator. Each of the components are mounted in one of two divided housings. The first housing and the second housing are connected rotatably to each other by a hinge. The wireless telephone has an electrical connecting member (for example lead wires) which connect related electrical components in the housings. In many cases of folding type telephones, the electrical connecting member is wired through the hinge of the telephone.

Referring to the drawing, the above-mentioned prior art wireless telephone is described as follows.

FIG. 6 is an open sectional view of a wireless telephone opened and FIG. 7 is a sectional view of a closed wireless telephone.

In FIG. 6 and FIG. 7, the first housing 1 has a speaker, the second housing 2 has a microphone. The hinge 3, which is connected between the first housing and the second housing, has an axis of rotation 4. Some electrical and electronic components (not shown) are mounted on a printed circuit board 5 in the first housing 1. Some electrical and electronic components (not shown) are also mounted on a printed circuit board 6 in the second housing 2. An electrical connecting member 7 (such as wires) connects the printed circuit board 5 and the printed circuit board 6 through the hinge 3. Soldering sections 8 and 9 solder the printed circuit boards 5 and 6 to the electrical connecting member 7.

In this conventional wireless telephone electrical connecting member 7, which passes through the hinge 3, is given an appropriate length so that the soldering sections 8, 9 are not stretched when the first housing 1 and the second housing 2 are closed as shown in FIG. 7. Accordingly, when the first housing 1 and the second housing 2 are open as shown in FIG. 6, the electrical connecting member 7 may touch the insides of the first housing 1, the second housing 2 and the hinge 3 by bending of the electrical connecting member 7.

However, in this conventional wireless telephone apparatus, the first housing 1 and the second housing 2 cannot be smoothly opened and closed. For that reason, the electrical connecting member 7 is liable to touch the inside of the first housing 1, the second housing 2 or the hinge 3, due to constantly being bent by the repeated motions of opening and closing of the first housing 1 and the second housing 2. In addition, connecting portions of the soldering section 8 and 9 are liable to break during use because the connecting parts receive stress during opening and closing of the housings.

This problem caused by repeated bending is solved by increasing the size of the space inside the first housing 1, the second housing 2 and the hinge 3, in order to prevent touching of the bending of the electrical connecting member 7 to the inside walls of hinge 3 in open state of the housings 1, 2. However, this is not desirable for miniaturized telephones.

OBJECT AND SUMMARY OF THE INVENTION

It is an object of the present invention to provide a telephone in which breaking of an electrical connecting member in its housing of folding type is prevented without undesirable increase of size of housing and a hinge, and the housing can be opened and closed smoothly.

The folding telephone of the present invention accomplishes the above recited objects by having an electrical connecting member that electrically connects a first housing to a second housing. The first and second housings, which are attached at a hinge, each have one end of the electrical connecting member soldered to it. This establishes a conductive electrical path. Furthermore the electrical connecting member is wound at least twice around the shaft of the hinge to prevent the soldered electrical connection from breaking and to prevent abrasion between the different portions of the wound electrical connecting member and the electrical connecting member and the various portions of the hinge. Thus, a folding type telephone that can be repeated opened and closed results.

BRIEF DESCRIPTION OF THE DRAWINGS

While the novel features of the invention are set forth particularly in the appended claims, the invention, both as to organization and content, will be better understood and appreciated, along with other objects and features thereof, from the following detailed description taken in conjunction with the drawings in which:

DESCRIPTION OF THE PREFERRED EMBODIMENT

Hereafter, a wireless telephone as a preferred embodiment of the present invention is described with reference to the accompanying drawings of FIG. 1 through FIG. 5.

Figure 1:
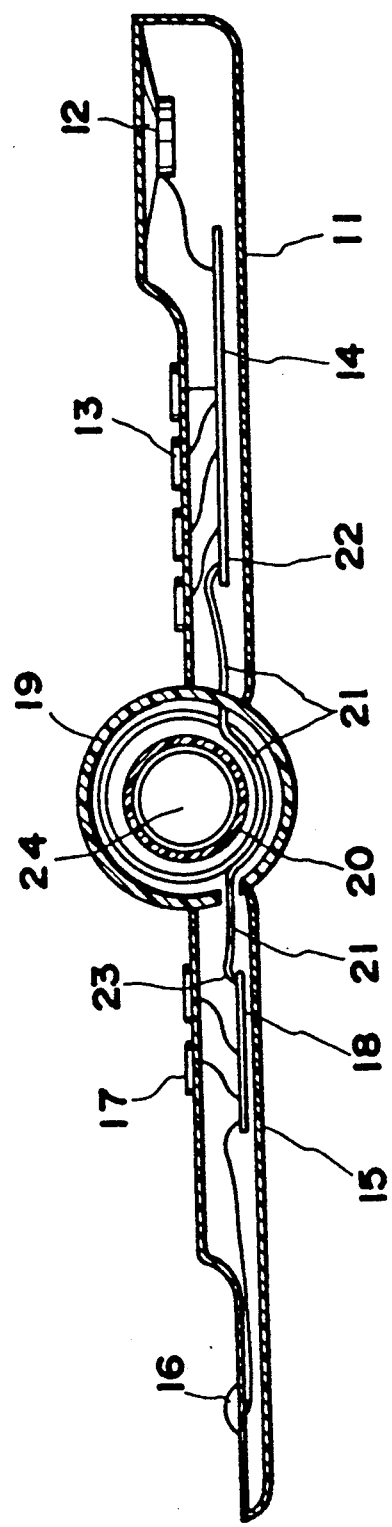
FIG. 1 is a sectional view of a telephone with the housings in an open state for a preferred embodiment of the present invention.
Figure 2:
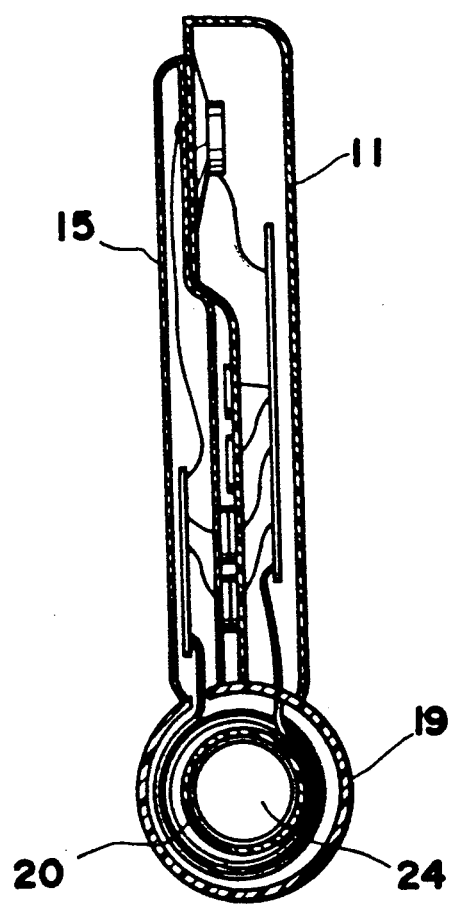
FIG. 2 is a sectional view of the telephone with the housings in a closed state for the embodiment shown in FIG. 1.
Figure 3:
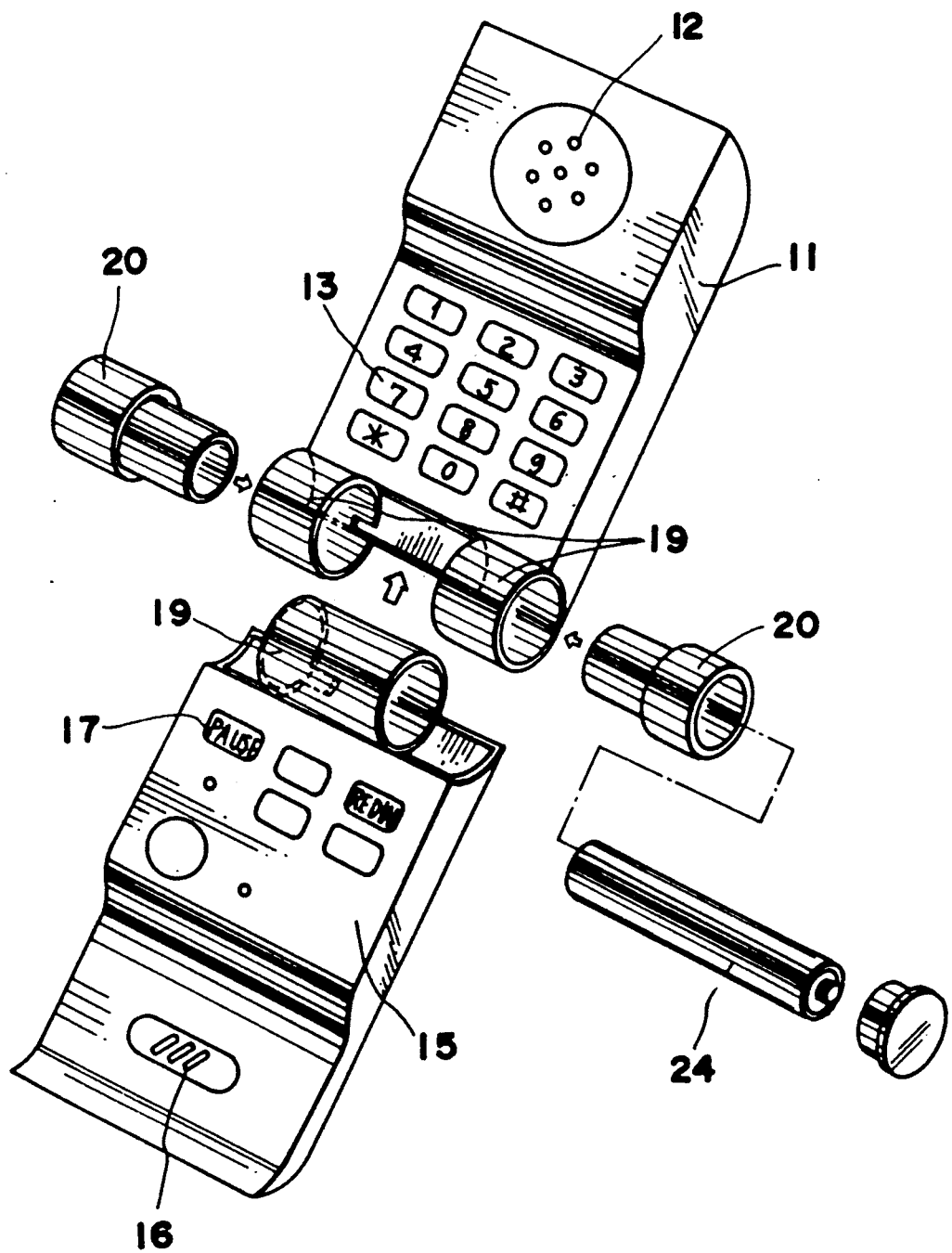
FIG. 3 is an exploded perspective view of the telephone for the embodiment shown in FIG. 1.
Figure 4:
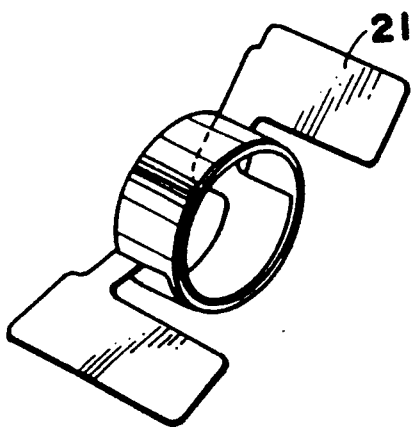
FIG. 4 is a perspective view of an electrical connecting member of the telephone for the embodiment shown in FIG. 1.
Figure 5:
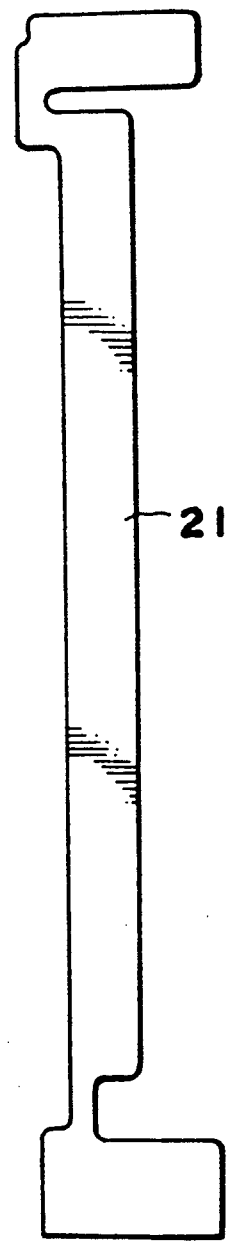
FIG. 5 is a plan view of the electrical connecting member is a spread state.
Figure 6:
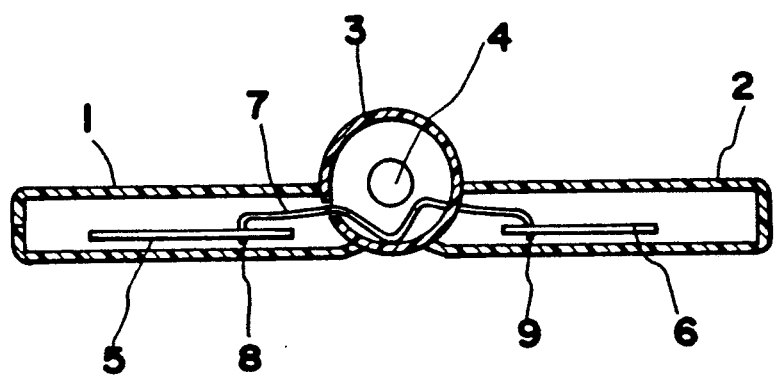
FIG. 6 is the sectional view of the conventional telephone with the housings in an open state.
Figure 7:
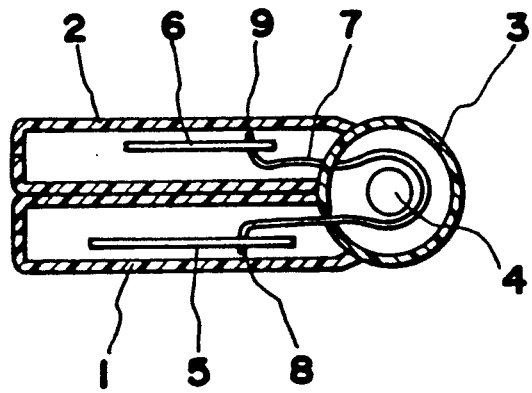
FIG. 7 is the sectional view of the conventional telephone shown in FIG. 6 with the housing in the closed state.

FIG. 1 is a sectional view of a wireless telephone with the first housing and the second housing in an open state. FIG. 2 is a sectional view of the telephone in a closed state. FIG. 3 is an exploded perspective view of the telephone. In the drawings, a speaker 12 and push buttons for dialing 13 is provided to the first housing 11. A printed circuit board 14 (see FIGS. 1 and 2) which is electrically connected to the speaker 12 and the push buttons for dialing and has electric/electronic components thereon is provided in the first housing 11. A retractable antenna (not shown) for wireless communications is also provided in the first housing. A microphone 16 and various operation control switches 17 are attached to the second housing 15. Another printed circuit board 18, which is electrically connected to the microphone 16 and the various operation control switches 17 has electric/electronic components thereon and is provided in the second housing 15. A hinge 19 rotatably connects the above-mentioned two housings 11, 15. A shaft 20 of the hinge 19 is designed to be hollow. Thus, the hinge 19 has a double cylindrical configuration. Dry battery 24 for supplying power to the above-mentioned electrical/electronic components is inserted in the above-mentioned hollow space in the shaft 20. An electrical connecting member 21 connects the printed circuit board 14 and the printed circuit board 18, passing through a space between the inside wall of the hinge 19 and the outside wall of the shaft 20. In this embodiment, a flexible printed circuit ("FRC") is used as the electrical connecting member 21. The electrical connecting member 21 is normally in wound shape as shown in FIG. 4. Its shape when spread out is shown in FIG. 5. The electrical connecting member 21 is wound several times around the shaft 20 and inside the hinge 19. A soldering section 22 connects the printed circuit board 14 and one end of the electrical connecting member 21. A soldering section 23 connects the printed circuit board 18 and the other end of the electrical connecting member 21. The numeral 24 designates the dry battery.

Operation of the wireless telephone of the above-mentioned embodiment is as follows:

When the housings 11, 15 of the wireless telephone are closed, the electrical connecting member 21, which passes in the hinge 19, is relatively stretched by the printed circuit board 14 and the printed circuit board 18. As a result, the electrical connecting member 21, which is wound around the shaft 20, is relatively stretched, and hence, the diameter of the wound portion decreases. Since the diameter relatively decreases, the wound inside diameter of the electrical connecting member 21 is so designed as not tightly fit the outside face of the rotation shaft 20, because of the length of the electrical connecting member 21.

However, when the electrical connecting member 21 is wound n-times around the rotation shaft 20, the decrease of diameter at stretched state of the electrical connecting member 21 during the closing operation of the housings causes the diameter of the wound part to decrease by only $1/\pi n$ of the displacement in the stretching direction than a conventional electrical connecting member of straight configuration. Because of that reason, the diameter of the wound part of electrical connecting member 21 need not be large, but a small addition to the outer diameter of the shaft 20 is enough.

Next, when the housings 11, 15 of the wireless telephone are opened as in FIG. 1, the respective ends of the electrical connecting member 21 push the printed circuit board 14 of the first housing 11 and the printed circuit board 18 of the second housing 15. At that time too, the diameter of the wound part of the electrical connecting member 21 on the shaft 20 increases by only $1/\pi n$. Therefore, the electrical connecting member 21 will not touch the inside surface of the hinge 19.

In accordance with the above-mentioned present invention, as the electrical connecting member 21 is wound at least one time around the shaft 20 of hinge 19, variation in the diameter of the wound part during opening and closing movements of the first housing 11 and the second housing 15 is small. Breaking of the soldering section of the electrical connecting member 21 by strong pushing thereof by the electrical connecting member 21 can be prevented. Also, the housings 11, 15 can be moved smoothly during opening and closing without an increase in the size of the hinge 19.

Further, by designing the hinge 19 in double cylindrical configuration, the dry battery 24 can be contained in the cylindrical hollow space in the hinge 19, thereby realizing effective utilization of space to achieve a small-size design of the telephone.

Although only one embodiment of the invention has been disclosed and described, it is apparent that other embodiments and modification of the invention are possible.

What is claimed is:

1. A telephone apparatus comprising:
   a first housing having electrical and electronic components including a speaker;
   a second housing having electrical and electronic components including a microphone;
   a hinge having a shaft, an outer sleeve, and a space between the outside of said shaft and the inside of said outer sleeve for rotatably connecting said first housing to said second housing, said hinge having the ability to rotate about 180°; and
   an electrical connecting member for electrically connecting said electrical and electronic components of said first housing to said electrical and electronic components of said second housing, said electrical connecting member being wound at least two times around said shaft of said hinge.

2. A telephone apparatus that operates using electrical power from a battery comprising:
   a first housing having electrical and electronic components including a speaker;
   a second housing having electrical and electronic components including a microphone;
   a hinge for rotatably connecting said first housing to said second housing, said hinge having a shaft with a cylindrical hollow space for holding said battery to supply electrical power to said electrical and electronic components, said hinge having the ability to rotate about 180°; and
   an electrical connecting member for electrically connecting said electrical and electronic components of said first housing said electrical and electronic components of said second housing, said electrical connecting member being wound at least two times around said shaft in an area between an outside of said shaft and the inside of said outer sleeve.

3. A telephone apparatus comprising;
   a first housing having electrical and electronic components including a speaker;
   a second housing having electrical and electronic components including a microphone;
   a hinge having a shaft, an outer sleeve, and a space between the outside of said shaft and the inside of said outer sleeve for rotatably connecting said first housing to said second housing, said hinge having the ability to rotate about 180°; and
   an electrical connecting member for electrically connecting said electrical and electronic components of said first housing to said electrical and electronic components of said second housing using a soldered connection, said electrical connecting member being wound at least two times around said shaft of said hinge to prevent breakage of said soldered connection between said electrical connecting member and said first and second housings during repeated rotation of said hinge.

* * * * *